(12) United States Patent
Lonaeus (10) Patent No.: US 11,885,519 B2
(45) Date of Patent: Jan. 30, 2024

(54) DYNAMIC RETROFIT CONTROL OF DUCTLESS MINI-SPLIT SYSTEMS

(71) Applicant: Alarm.com Incorporated, Tysons, VA (US)

(72) Inventor: Gustaf Nicolaus Maxwell Lonaeus, Washington, DC (US)

(73) Assignee: Alarm.com Incorporated, Tysons, VA (US)

( * ) Notice: Subject to any disclaimer, the term of this patent is extended or adjusted under 35 U.S.C. 154(b) by 20 days.

(21) Appl. No.: 17/719,785

(22) Filed: Apr. 13, 2022

(65) Prior Publication Data

US 2022/0341615 A1 Oct. 27, 2022

Related U.S. Application Data (60) Provisional application No. 63/178,103, filed on Apr. 22, 2021.

(51) Int. Cl.
  *F24F 11/49* (2018.01)
  *F24F 11/46* (2018.01)
  (Continued)

(52) U.S. Cl.
  CPC ............ *F24F 11/46* (2018.01); *F24F 1/0003* (2013.01); *F24F 11/49* (2018.01); *F24F 11/61* (2018.01);
  (Continued)

(58) Field of Classification Search
  CPC ..... F25B 2700/15; F24F 1/0003; F24F 11/30; F24F 11/49; F24F 11/61; F24F 11/63; F24F 2140/60
  See application file for complete search history.

(56) References Cited

U.S. PATENT DOCUMENTS 6,089,310 A * 7/2000 Toth .................... F24F 11/52
  62/131
8,639,459 B1 1/2014 Morales et al.
  (Continued)

FOREIGN PATENT DOCUMENTS

EP 2551614 A2 * 1/2013 ............. F25B 13/00

OTHER PUBLICATIONS

Sutherland et al., "Evaluation of Mini-Split Heat Pumps as Supplemental and Full System Retrofits in a Hot Humid Climate," ACEEE Summer Study on Efficiency in Buildings, Pacific Grove, CA (2016), Aug. 2016, Retrieved on May 29, 2022 from <http://publications.energyresearch.ucf.edu/wp-content/uploads/2018/06/FSEC-RR-646-16.pdf>, 18 pages.
(Continued)

*Primary Examiner* — Jonathan Bradford
(74) *Attorney, Agent, or Firm* — Fish & Richardson P.C.

(57) ABSTRACT

A retrofit control of a ductless mini-split system (DMSS) for use in relation to temperature monitoring within a property. Data indicating a command is transmitted to a controller associated with a ductless mini-split system. The command causes the controller to configure an operation to be performed by the ductless mini-split system. Power output associated with the ductless mini-split system is monitored based on transmitting the data indicating the command. A determination that the operation has been performed by the ductless mini-split system is made based on monitoring the power output. Data indicating that the operation has been performed by the ductless mini-split system is provided for output.

20 Claims, 6 Drawing Sheets

(51) Int. Cl.
*F24F 1/0003* (2019.01)
*F24F 11/66* (2018.01)
*F24F 11/61* (2018.01)
*F24F 11/63* (2018.01)
*F24F 140/60* (2018.01)

(52) U.S. Cl.
CPC ............ *F24F 11/63* (2018.01); *F24F 11/66* (2018.01); *F24F 2140/60* (2018.01); *F24F 2221/32* (2013.01); *F25B 2700/15* (2013.01)

(56) References Cited

U.S. PATENT DOCUMENTS

| | | |
|---|---|---|
| 9,590,863 B1 | 3/2017 | Martin |
| 2012/0053738 A1 | 3/2012 | Lingrey et al. |
| 2015/0100163 A1 | 4/2015 | Allmaras et al. |
| 2017/0321920 A1 | 11/2017 | Rosen |

OTHER PUBLICATIONS

PCT International Search Report and Written Opinion in International Appln. No. PCT/US2022/071863, dated Jun. 16, 2022, 13 pages.

\* cited by examiner

DYNAMIC RETROFIT CONTROL OF DUCTLESS MINI-SPLIT SYSTEMS

CROSS-REFERENCE TO RELATED APPLICATIONS

This application claims the benefit of U.S. Provisional Patent Application No. 63/178,103, filed on Apr. 22, 2021 and titled "DYNAMIC RETROFIT CONTROL OF DUCTLESS MINI-SPLIT SYSTEMS," which is incorporated herein by reference in its entirety.

TECHNICAL FIELD

This disclosure relates to home monitoring technology.

BACKGROUND

Ductless, mini-split systems (DMSSs) are a type of heating, ventilation and air conditioning (HVAC) technology. A DMSS typically includes two key components—an outdoor compressor/condenser, and an indoor air-handling unit. The indoor unit and the outdoor unit are typically linked by a conduit that houses a power cable, refrigerant tubing, suction tubing, and a condensate drain. Since mini splits have no ducts, they avoid the energy losses associated with ductwork of central forced air systems. In some instances, duct losses can account for more than 30% of energy consumption for space conditioning, especially if the ducts are in an unconditioned space such as an attic.

SUMMARY

Systems and techniques are described for using retrofit control of a DMSS to improve functionality and use in relation to temperature monitoring within a property. As described herein, "retrofit" refers to ability to add a feature (e.g., component, accessory, function) to a ductless, mini-split system that did not have the feature when manufactured. In this context, the retrofit control systems disclosed herein can be aftermarket devices that enable additional and/or enhanced features to a DMSS. One example is enabling bidirectional communications with the DMSS so that a user can receive confirmation of successful execution of a command sent to the DMSS. Another example is automatically (e.g., with limited or no user intervention) enabling and/or disabling a DMSS based on temperature data monitored by one or more external temperature measurement devices, such as a thermostat located in a property. In this way, retrofit control provides both improved functionality (e.g., by enabling confirmation of command execution) and enhanced functionality that is otherwise unable to be performed by a DMSS without use of retrofit control.

The retrofit control systems disclosed include components that are configured to interact with a DMSS. In some instances, a retrofit control system includes a controller and an energy measurement device that work together to enable command confirmation. For example, the controller can provide commands to control operation of an indoor unit by, for example, powering on the device and powering off the device. The controller can communicate with a monitoring system of a property so that a user can control the indoor unit through, for instance, a mobile application running on a user device. Once a command is provided to the indoor unit, the energy measurement device monitors power usage by the indoor unit to confirm operation of the device. For example, if the controller provides a command to the indoor unit to initiate a cooling operation and the energy measurement device then determines that power consumption of the indoor unit has increased within a certain time period of the command being provided (e.g., 3, 10, 30 seconds), then the retrofit control system can confirm that the command was successfully performed. In some instances, the controller can be configured to send follow-up commands to the DMSS if execution of a command is unable to confirmed. For example, if the energy measurement device does not detect a change in power usage (and, thus, confirmation of a first command is unable to be obtained), then the controller can be configured to provide additional commands until a confirmation is received. In this way, the retrofit systems can use follow-up commands to improve the likelihood that a DMSS successfully performs a command.

Implementations of the described techniques can include hardware, a method or process implemented at least partially in hardware, or a computer-readable storage medium encoded with executable instructions that, when executed by a processor, perform operations.

The details of one or more implementations are set forth in the accompanying drawings and the description below. Other features will be apparent from the description and drawings.

DESCRIPTION OF DRAWINGS

In the drawings, like reference numbers represent corresponding parts throughout.

DETAILED DESCRIPTION

In general, techniques are described for using retrofit control of a ductless mini-split system (DMSS) to improve functionality and use in relation to temperature monitoring within a property. The retrofit control systems disclosed herein can include aftermarket devices that enable additional and/or enhanced features to a DMSS. One example is enabling bidirectional communications with a DMSS so that a user can receive confirmation of successful execution of a command sent to the DMSS. Another example is automatically (e.g., with limited or no user intervention) enabling and/or disabling a DMSS in relation to heating/cooling operations based on temperature data monitored by one or more temperature measurement devices, such as a thermostat located in a property. In this way, retrofit control provides both improved functionality (e.g., by enabling confirmation of command execution) and enhanced functionality that is otherwise unable to be performed by a DMSS without use of retrofit control.

Figure 1:
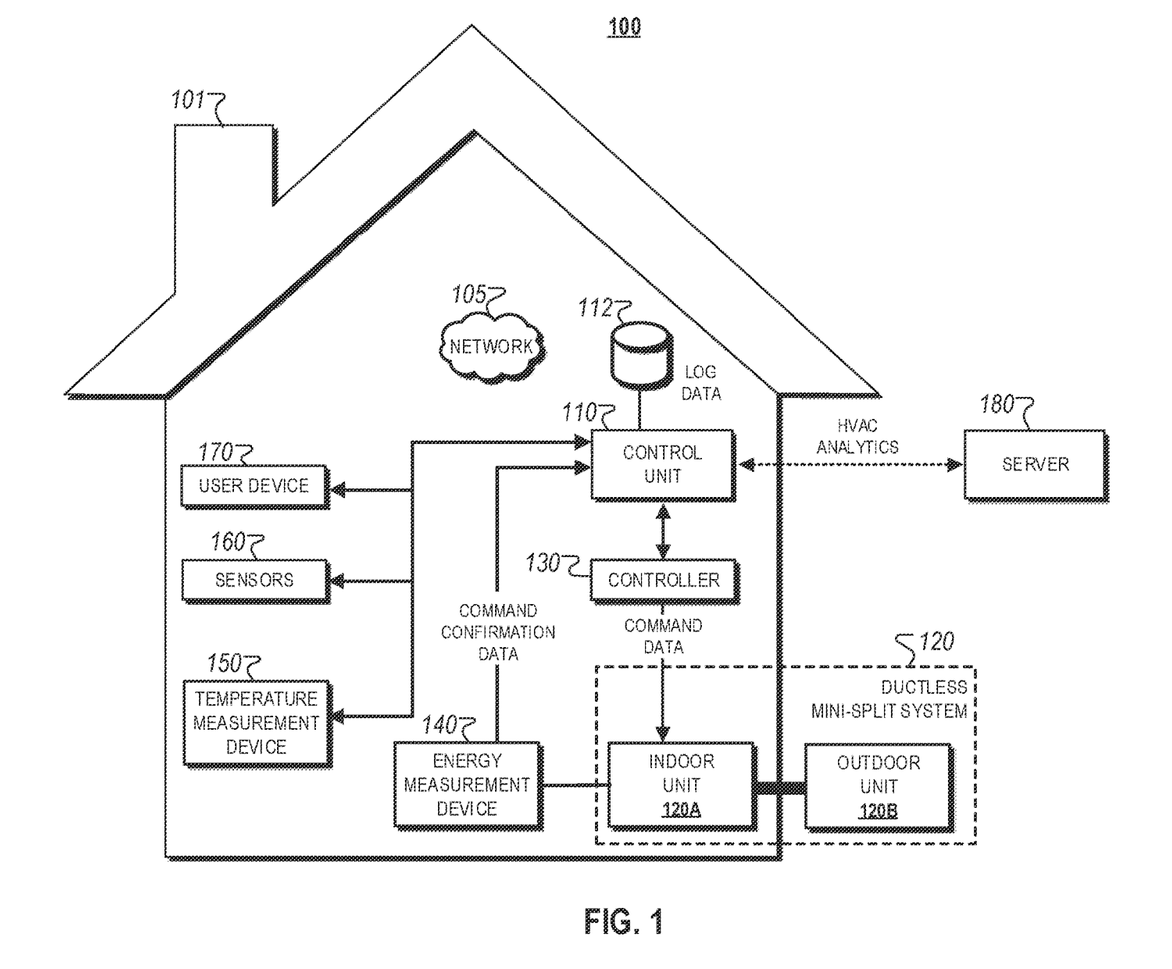
FIG. 1 illustrates an example of a retrofit control system of a property.

FIG. 1 illustrates an example of a retrofit control system 100 of a property 101. The system 100 includes a control unit 110, a DMSS 120, a controller 130, an energy measurement device 140, a temperature measurement device 150, sensors 160, a user device 170, and a server 180. The components of system 100 can connect to network 105, and optionally, can exchange communications with a server 180 through a network-based connection.

Network 105 can be configured to enable electronic communications between electronic devices. For example, the network 105 can be configured to enable exchange of electronic communications between the control unit 110, the DMSS 120, the controller 130, the energy measurement device 140, the temperature measurement device 150, the sensors 160, the user device 170, and the server 180. The network 105 can include Local Area Networks (LANs), Wi-Fi, or analog or digital wired and wireless networks (e.g., Zigbee, Z-wave). The network 105 can include multiple networks or subnetworks, each of which can include, for example, a wired or wireless data pathway. The network 105 can also include a circuit-switched network, a packet-switched data network, or any other network able to carry electronic communications (e.g., data or voice communications). For example, the network 105 can include networks based on the Internet protocol (IP), or other comparable technologies. In some examples, the network 105 can include wide area networks (WAN) of computers that receive services provided by a service provider.

The control unit 110 can be a computing device that controls aspects of monitoring operations performed by the components of the system 100. The control unit 110 can include a network module and a controller. The network module can be a communication device configured to exchange communications over the network 105. The network module can be a wireless communication module configured to exchange wireless communications over the network 105. For example, the network module can be a wireless communication device configured to exchange communications over a short-range wireless network. The network module can also be configured to exchange communications over the network 105 using a wireless connection. For instance, the network module can enable the control unit 110 to exchange communications with the server 180 over the network 105. The wireless communication device can include one or more GSM modules, a radio modem, a cellular transmission module, or any type of module configured to exchange communications in one of the following formats: LTE, GSM or GPRS, CDMA, EDGE or EGPRS, EV-DO or EVDO, UMTS, IP, Wi-Fi, or cellular-based networks (e.g., 2G, 3G, 4G, 5G, etc.).

The network module can also can be a wired communication module configured to exchange communications over the network 105 using a wired connection. For instance, the network module can be a modem, a network interface card, or another type of network interface device. The network module can be an Ethernet network card configured to enable the control unit 110 to communicate over a local area network and/or the Internet. The network module can also be a voiceband modem configured to enable an alarm panel to communicate over the telephone lines of Plain Old Telephone Systems (POTS). In some implementations, the alarm panel can be a broadband or cellular gateway where the network module can enable the control unit 110 to communicate over the network 105.

The control unit 110 can communicate with the controller 130, the energy measurement device 140, the temperature measurement device 150, the sensors 160, the user device 170 and the server 180 wirelessly transmit data generated from the components of the system 100 over the network 105. In some instances, the control unit 110 can periodically receive data activity reports from the controller 130, the energy measurement device 140, the temperature measurement device 150, the sensors 160, the user device 170 and the server 180. The data activity reports can include information related to the property, e.g., temperature data, activity data, movement data, device usage data, among others.

In addition, the control unit 110 can periodically receive sensor data collected by the controller 130, the energy measurement device 140, the temperature measurement device 150, and the sensors 160. For example, the control unit 110 can periodically receive temperature data collected by the temperature measurement device 150 and use the temperature data to instruct the controller 130 to send a command to enable or disable the DMSS 120. Temperature data can include an ambient temperature of the property measured by the temperature measurement device 150 or adjustments to setpoint temperature specified by the user in relation to the temperature measurement device 150 (e.g., reducing the setpoint temperature of a thermostat by five degrees). As another example, the control unit 110 can obtain power consumption data measured by the energy measurement device 140 to determine that a command provided by the controller 130 to the DMSS 120 was successfully executed.

The DMSS 120 can be any type of ductless heating/cooling system that does not require full-sized air ducts to perform temperature regulation within a property. The DMSS 120 can include one or more indoor units, such as indoor unit 120A, each of which includes a fan and functions as an evaporator unit. The DMSS 120 can also include an outdoor unit, such as outdoor unit 120B, which functions as a compressor/condenser. The indoor unit(s) and the outdoor unit can be linked and/or connected using a conduit that houses, for instance, a power cable, refrigerant tubing, suction tubing, a condensate drain, among others.

The DMSS 120 can be configured different types of heating/cooling applications. In various implementations, the DMSS 120 can be configured to provide hydronic heating (e.g., using hot water heat), include radiant panels, space heaters (e.g., wood, kerosene, propane), among others.

In some implementations, the DMSS 120 can be configured to provide multi-zone or multi-region heating/cooling capabilities. In such implementations, the DMSS 120 includes a plurality of indoor units that are each positioned in a different region of a property (e.g., indoor units positioned in different rooms of the property). Each indoor unit can be associated with a corresponding temperature measurement device so that temperature data collected by individual temperature measurement devices can be used to condition a specific region based on controlling its corresponding indoor unit.

The controller 130 is a device component configured to transmit commands to the DMSS 120 based on input data relating to the commands. The input data can include interactions with physical buttons by a user, command data received from other components (e.g., control unit 110, user device 170) that relates to commands to be provided to the DMSS 120, among others. In some implementations, the controller 130 is an infrared (IR) remote configured to provide IR commands to an IR receiving sensor of the DMSS 120 (e.g., an IR receiving sensor on the indoor unit 120A of the DMSS 120). The controller 130 can be programmed to operate as a replacement for a standard controller that is manufactured with the DMSS 120. For example, the controller 130 can emulate standard commands that are recognized by a command receiving element of the DMSS 120. The controller 130 can thereby provide commands to the DMSS 120 in a manner that does not require reconfiguration and/or adjustment of the DMSS 120.

The controller 130 can also be configured to communicate with the control unit 110, the energy measurement device 140, the temperature measurement device 150, the sensors 160, and/or the user device 170 over the network 105. For example, the controller 130 can provide commands to the DMSS 120 based on instructions received from the control unit 110, the energy measurement device 140, the temperature measurement device 150, the sensors 160, and/or the user device 170 to provide remote control of the DMSS 120. In this way, the controller 130 permits retrofit control of the DMSS 120 by components that were not originally manufactured to be capable of communicating with the DMSS 120.

The energy measurement device 140 is a device component configured to measure or detect parameters relating to power consumption by the DMSS 120. The energy measurement device 140 can include one or more an ammeter, capacitance meter, a current clamp, a curve tracer, a Cos Phi meter, an electricity meter, a multimeter, an ohmmeter, an oscilloscope, among other types of electrical or electronic equipment. The energy measurement device 140 can detect any suitable measurement parameter, such as current, voltage, resistance, capacitance, or impedance, associated with operation of the DMSS 120.

In some implementations, the energy measurement device 140 is an in-line energy meter that measures power consumption by plugging into a power cable of the DMSS 120. For example, the in-line energy meter can be plugged into the power cable of the indoor unit 120A to determine, for instance, when the indoor unit 120A is turned on, when the indoor unit 120A is turned off, when the indoor unit 120A initiates or terminates a cooling operation, when the indoor unit 120A initiates or terminates a heating operation, when the indoor unit 120A transitions from a heating operation to a cooling operation, when the fan is run without actively heating or cooling, among other functions of the DMSS 120.

The temperature measurement device 150 is a device component configured to sense temperature, such as the ambient temperature within a property. For example, the temperature measurement device 150 can be a thermostat that performs actions to that ambient temperature within a property is maintained near a desired setpoint temperature. In some instances, the temperature measurement device 150 is a smart thermostat that is configured to operate with home automation features. In such instances, the temperature measurement device 150 can automatically control heating, ventilation, and air condition of a property, and also include additional functionality, such as temperature control through other network-enabled devices, such as the user device 170. In some examples, the temperature measurement device 150 is a standalone device that measures temperature and provides the measured temperature for output (e.g., to the control unit 110). In such examples, the temperature measurement device 150 may not include the functionalities of a thermostat (e.g., regulating device) but is configured to measure temperature and provide the measured temperature for output.

In some implementations, the temperature measurement device 150 is integrated into the controller 130 such that the controller 130 provides functionality relating to providing commands to the DMSS 120 as well as collected temperature data related to the property 101.

The sensors 160 can include various types of sensors that are placed within a property. For example, the sensors 160 can include a contact sensor, a motion sensor, a glass break sensor, an occupancy sensor, an activity sensor, or any other type of sensor that is typically included in a monitoring system or security system. The sensors 160 also can also include environmental sensors such as an ambient temperature sensor, a water sensor, a rain sensor, a wind sensor, a light sensor, a smoke detector, a carbon monoxide detector, an air quality sensor, etc. In some instances, the sensors 160 can include a radio-frequency identification (RFID) sensor that identifies a particular article that includes a pre-assigned RFID tag.

The user device 170 can be any type of computing device that is used or associated with a user in association with a property. For instance, the user device 170 can be one or more of a smartphone, wearable device, a tablet computing device, a laptop computing device, or a desktop computing device. The user device 170 can be used to allow a property owner to access, control, and/or configure the system 100 through a monitoring application. For example, the monitoring application can allow the property owner to perform various actions, such as transmitting access an interface on the user device 170 to provide a command to the DMSS 120 through use of the controller 130.

In some implementations, the user device 170 is configured to provide touch-sensitive interfaces that permit gesture-based control of the system 100. The user can provide gesture-based inputs (e.g., swipes, flicks, pinch-in, pinch-out, edge-based swipe) to perform various actions relating to system control. For example, the user can provide an upward swipe input to instruct the controller 130 to turn on the DMSS 120. As another example, the user can provide a downward swipe to obtain access energy consumption data collected by the energy measurement device 140 to confirm that a command was successfully executed by the DMSS 120.

A user can also use a monitoring application to control the monitoring operations of system 100. For example, the user can use the monitoring application to turn the appliances on and off, transmit instructions to the sensors 160 to collect and/or store sensor data, or transmit an instruction to the control unit 110 to provide locally stored data to the server 180. In some instances, the monitoring application enables a user to remotely configure the components of the system 100 while he/she is away from the property. For example, the user can access the monitoring application while remote from the property and instruct the temperature measurement device 150 to measure air temperature in the property. Data collected by the temperature measurement device 150 can then be provided to the control unit 110, which then relays the data to the server 180 (or other servers associated with the system 100) over the Internet. A user can then access the temperature data through the monitoring application so to, for instance, identify regions of the property that may have inadequate heating or cooling (and therefore are susceptible to property damage).

The server 180 can be an electronic device configured to provide monitoring services in association with a property by exchanging electronic communications with the control unit 110 over the network 105. For example, the server 180 can be configured to monitor events, e.g., temperature data periodically collected by the temperature measurement device 150, a change to a setpoint temperature setting of the temperature measurement device 150, commands provided by the controller 130 to the DMSS 120, power consumption data collected by the energy measurement device 140, among others. In these examples, the server 180 can exchange electronic communications with the network module of the control unit 110 to receive information regarding events detected by the control unit 110.

In some implementations, multiple components of the system 100 can be combined into a single device that provides functionality described in reference to each combined component. For example, the control unit 110 can include components that perform the functions of the controller 130, the energy measurement device 140, and the temperature measurement device 150. In this example, the control unit 110 can use temperature data to determine when to provide to the DMSS 120 and the type of command to provide to the DMSS 120. The control unit 110 can then use a suitable communication protocol (e.g., IR) to provide a command to the DMSS 120, and then measure power consumption associated with the DMSS 120 after providing the command. In such implementations, the incorporation of componentry into a single physical device (e.g., control unit 110) provides certain advantages, such as reduced likelihood of communication bottlenecks between separate components, reduced latency associated with data collection and command transmission, or reduced possibility of device failure.

Figure 2:
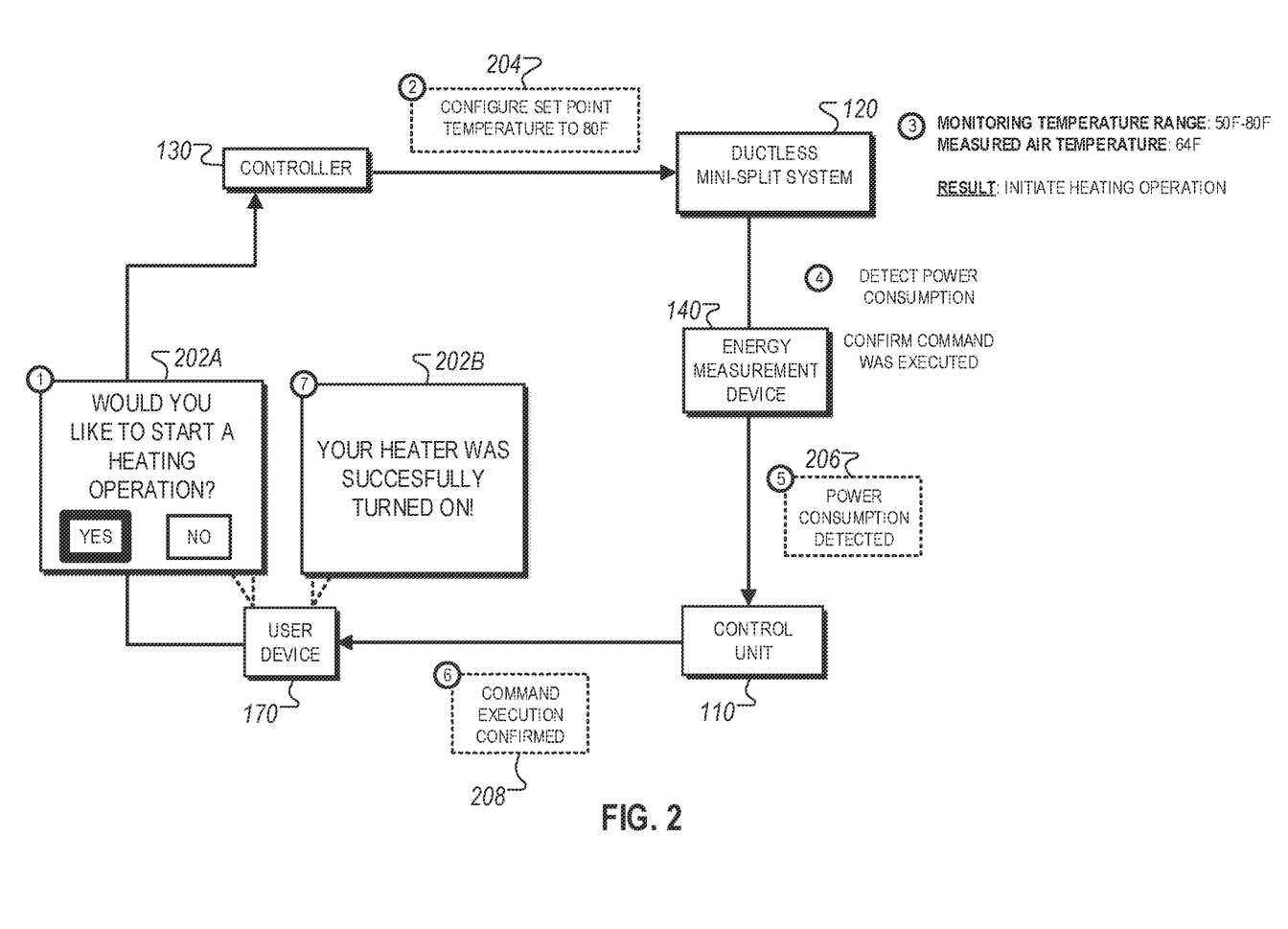
FIG. 2 illustrates an example of a technique for enabling command execution confirmation using a retrofit control system.

FIG. 2 illustrates an example of a technique for enabling command execution confirmation using a retrofit control system. This technique enables a system (e.g., system 100) to provide a command to the DMSS 120 and confirm that the command was successfully performed by the DMSS 120 based on monitoring power consumption in relation to command transmission.

The system implements the technique in a set of steps shown in FIG. 2. At step (1), the user device 170 provides an interface 202A to a user. The user device 170 can access interface 202A through an application running on the user device 170 (e.g., a monitoring application associated with the system 100) or through a webpage associated with the server 180. The interface 202A can be provided in response to a user actively requesting to initiate a hearing operation and/or passively based on monitoring a condition of a property, such as ambient temperature. As shown in FIG. 2, the interface 202A allows a user to select an option to initiate a heating operation. In this example, the heating operation is manually initiated by the user based on the selected option on the interface 202A. In some instances, the heating operation can be automatically initiated based on comparing measured temperatures to a desired setpoint temperature specified by a user. For example, the DMSS 120 can be automatically configured by the controller 130 to initiate a heating operation based on an air temperature measured by the temperature measurement device 150 being less than the setpoint temperature of the temperature measurement device 150. In this way, the DMSS 120 can be automatically configured to perform heating/cooling operations in a similar manner as an HVAC system being configured to operate based on temperature data collected by an associated thermostat.

At step (2), the controller 130 transmits a command 204 to the DMSS 120. The controller 130 can provide the command 204 based on an indication that the user has selected an option on the user interface 202A to initiate a heating operation. In some instances, the controller 130 communicates directly with the user device 170 (e.g., over a short-range connection) such that the controller 130 receives the indication from the user device 170 in response a user input provided on the user interface 202A. In some instances, the controller 130 receives the indication over a network (e.g., network 105) from either the user device 170 or the control unit 110.

The controller 130 provides command 204 to the DMSS 120 using any suitable communication protocol of the DMSS 120. For example, in some instances, the controller 130 is configured to provide the command 204 as an infrared (IR) remote signal that is received by an IR receiving sensor of the DMSS 120 (e.g., an IR receiving sensor on the indoor unit 120A of the DMSS 120). The controller 130 can be programmed to operate as a replacement for a standard controller that is manufactured with the DMSS 120. For example, the controller 130 can emulate standard commands that are recognized by a command receiving element of the DMSS 120. The controller 130 can thereby provide commands to the DMSS 120 in a manner that does not require reconfiguration and/or adjustment of the DMSS 120.

At step (3), the DMSS 120 receives the command 204 and initiates a heating operation based on the setpoint temperature of the DMSS 120 being set to a high temperature in the supported temperature range of the DMSS 120. The temperature range of the DMSS 120 can be a manufactured range of setpoint temperature values that the DMSS 120 is configured to use for temperature monitoring in relation to a measured temperature value by, for instance, an internal temperature sensor of the DMSS 120. For example, the DMSS 120 can be manufactured for a user to specify a setpoint temperature within 50 F-80 F temperature range. For instance, if the internal temperature sensor of the DMSS 120 measures a temperature value of 65 F, and the setpoint temperature is set to 75 F, then the DMSS 120 will initiate a heating operation until the measured temperature matches the setpoint temperature of 75 F. In contrast, if the internal temperature sensor measures a temperature value of 65 F, and the setpoint temperature is set to 63 F, then the DMSS 120 will initiate a cooling operation until the measured temperature matches the setpoint temperature of 63 F. As discussed throughout, while the DMSS 120 is typically configured to operate based on its own setpoint temperature, the systems and techniques described herein allow retrofit control of the DMSS 120 using other types of temperature data, such as measured temperature or set point temperature of the temperature measurement device 150. In this way, temperature monitoring by the temperature measurement device 150 is used for controlling operation of the DMSS 120 (instead of the default temperature monitoring capabilities of the DMSS 120). This approach can be preferrable since the DMSS 120 is not typically a connected device (e.g., a device configured for home automation), whereas the temperature measurement device 150 can be configured to communicate with other devices of the system 100, such as the control unit 110, the energy measurement device 140, the sensors 160, the user device 170, and/or the server 180. Another reason this approach can be preferable is since the temperature sensor of the DMSS 120 (which is the device performing the heating or cooling operation) sometimes provides a less accurate reading of the average air temperature in a room compared to the temperature measured by dedicated sensing device, such as the temperature sensor device 150, which may be located in a different part of the room.

The DMSS 120 receives the command 204 in a similar fashion as receiving a command from a remote that was manufactured with it. The command 204 includes a setpoint temperature that is used to configure the DMSS 120 to initiate a heating or cooling operation. As shown in FIG. 2, the command 204 includes a set point temperature of 80F since the monitoring temperature range of the DMSS 120 is 50 F-80 F. In this instance, DMSS 120 initiates a heating operation since the specified setpoint temperature is equal to the maximum temperature value of the monitoring temperature range of the DMSS 120. In some instances, the set point temperature specified in the command is equal to the minimum temperature value of the DMSS 120, which then results in the DMSS 120 initiating a cooling operation. In the example shown in FIG. 2, the command 204 specifies setting an internal setpoint temperature of the DMSS 120 to 80 Fahrenheit. In this example, this temperature value is matches the maximum temperature value (e.g., 80 Fahrenheit) of the monitoring temperature range of the DMSS 120. As a result, the DMSS 120 initiates a heating operation in response to receiving command 204.

The command 204 specifies a known setpoint temperature that is predetermined to cause the DMSS 120 to perform a desired operation. The value can be empirically determined so that the command can automatically result in the DMSS 120 initiating a heating or cooling operation. To accomplish this, the system empirically determines the monitoring temperature range of the DMSS 120 during, for instance, an initial registration/calibration operation of the DMSS 120. During this operation, the system uses the controller 130 to send test commands to the DMSS 120 to empirically identify the maximum and minimum temperature values of its monitoring temperature range. The controller 130 initially sends set point temperature values known to be higher or lower than those included in the monitoring temperature range (e.g., 30 F, 100 F). Such values are unlikely to result in a response from the DMSS 120 (since they are outside the monitoring temperature range). The controller 130 repeats this process by sending multiple sequential commands that incrementally decrease or increase the temperature values (e.g., by 1F). Once the controller 130 receives a response or acknowledgement by the DMSS 120 for each of the minimum and maximum values, the system can infer the monitoring temperature range of the DMSS 120. For example, if the monitoring temperature range is determined to be 50 F-80 F, then the system subsequently sends a command with a set point temperature of 80 F when attempting to instruct the DMSS 120 to initiate a heating operation, and a command with a set point of 50 F when attempting to instruct the DMSS 120 to initiate a cooling operation. Additionally, or alternatively, the controller 130 can also determine each of the minimum or maximum values based on monitoring energy consumption data measured by the energy measurement device 140 to confirm whether or not the DMSS 120 has executed a command.

In some implementations, the controller 130 may be configured to communicate with a remote controller that was manufactured with the DMSS 120. For example, the controller 130 may include an IR receiver that is configured to learn the format of IR data exchanged between a standard IR remote of the DMSS 120 and an IR receiver of the DMSS 120. In some instances, the controller 130 may be placed in recording mode to allow the controller 130 to identify and store the commands that the IR remote provides to the DMSS 120. Using this technique, the controller 130 can then emulate commands of the IR remote and replace its use in controlling the DMSS 120.

At step (4), the energy measurement device 140 detects power consumption data 206 associated with the DMSS 120. The energy measurement device 140 detects power consumed by the DMSS 120, which is then used to infer confirmation of command execution by the DMSS 120. For example, the energy measurement device 140 can be configured to one or more electronic components of the DMSS 120 and detect when the DMSS 120 is turned on. The energy measurement device 140 can detect any suitable measurement parameter, such as current, voltage, resistance, capacitance, or impedance, associated with operation of the DMSS 120. If the energy measurement device 140 detects change in a measurement parameter within a specified time period of the controller 130 providing the command 204 (e.g., within one second, thirty seconds, one minute, etc.), then the system 100 can confirm that the DMSS 120 successfully performed the command.

In the example shown in FIG. 2, the energy measurement device 140 detects the amount of power being consumed by the DMSS 120 within a predetermined time period after the controller 130 provides the command 204, which is then used to infer that the DMSS 120 successfully performed the command and initiated a heating operation. In this example, the energy measurement device 140 can be configured to the indoor unit 120A so that increased power consumption associated with the indoor unit 120A being turned on is used to indicate that the command 204 was successfully performed.

At step (5), the energy measurement device 140 provides the power consumption data 206 to the control unit 110. The power consumption data 206 indicates a change in power consumption was detected by the energy measurement device 140 within a predetermined time period of the command 204 being provided. For example, if the energy measurement device 140 detects increased power consumption by the DMSS 120, then power consumption data 206 indicates the increased power consumption. The change in power consumption can be associated with various types of operations performed by the DMSS 120, such as initiating a heating operation, initiating a cooling operation, beginning to run one or more fans of the DMSS 120 without specifically performing a heating/cooling operation, among others.

At step (6), the control unit 110 provides command confirmation data 208 to the user device 170. The control unit 110 determines whether the DMSS 120 successfully performed the command 204 based on the power consumption data 206 and generates command confirmation data 208. In the example shown in FIG. 2, the control unit 110 determines that the DMSS 120 successfully performed the command 204 based on the increased power consumption indicated by the power consumption data 206. At step (7), the user device 170 provides a notification 202B that the command was successfully executed by the DMSS 120. Additionally, or alternatively, information specified in the notification 202B can be provided to the server 180 for storage and/or logging.

Though not depicted in the example shown in FIG. 2, the system may use different types of commands in various implementations to instruct the DMSS 120 to perform a specified operation. For example, in some implementations, in response to receiving user input data specifying a set point temperature, the controller 130 may send a command with the specified set point temperature. In some implementations, the controller 130 provides binary "on" or "off" commands based on, for instance, user input data received from the user, temperature data being monitored by the temperature measurement device 150, among other types of signals that can be used to control operation of the DMSS 120.

Figure 3:
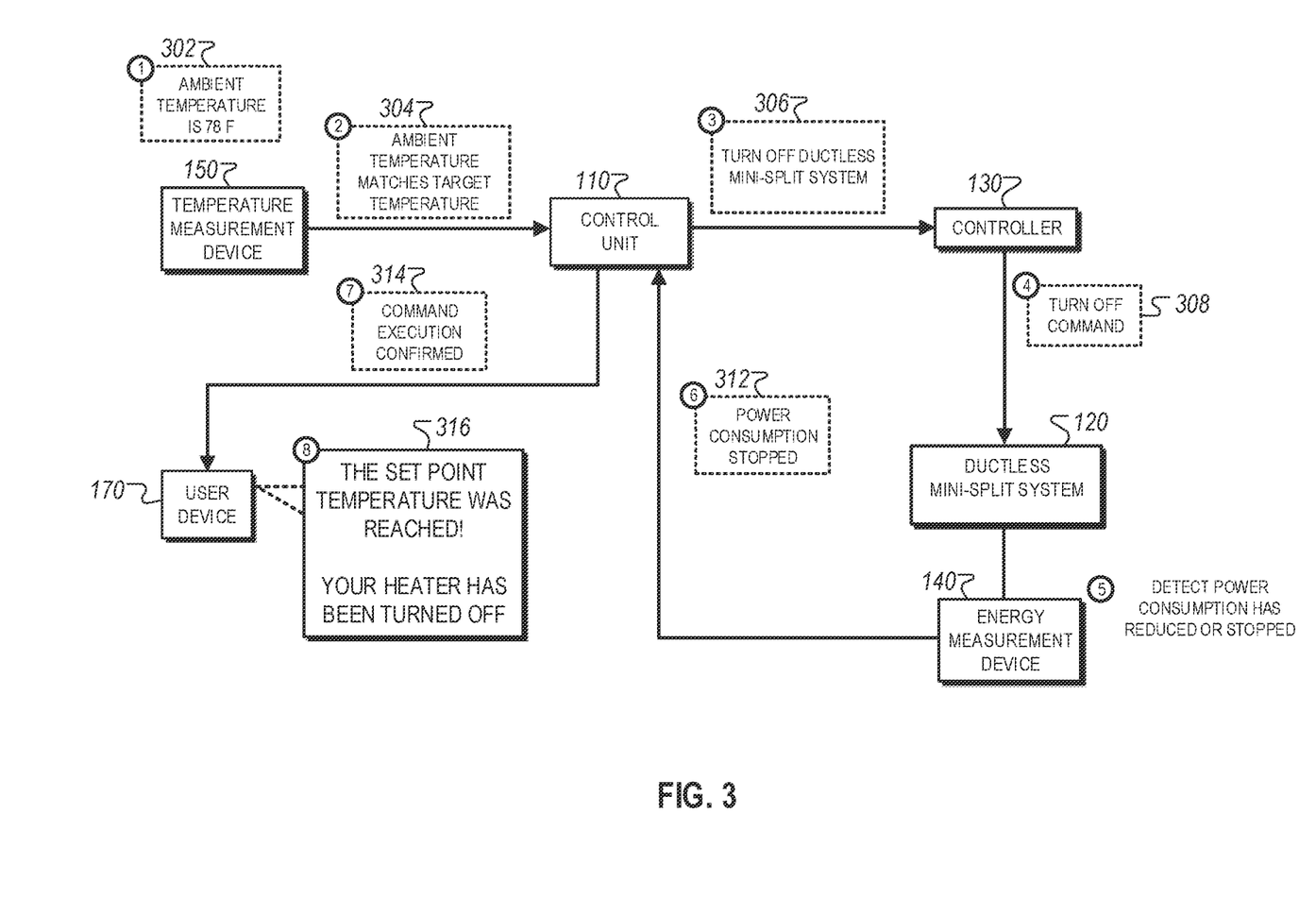
FIG. 3 illustrates an example of a technique for dynamically controlling a DMSS based on monitoring a setpoint temperature for a property.

FIG. 3 illustrates an example of a technique for dynamically controlling a DMSS based on monitoring a setpoint temperature for a property. This technique enables a system (e.g., system 100) to adjust the DMSS 120 based on the ambient temperature and the setpoint temperature monitored by the temperature measurement device 150. This allows the DMSS 120 to be controlled in a similar fashion as a HVAC system that is controlled based on temperature data measured by an associated thermostat.

The system implements the technique in a set of steps shown in FIG. 3. At step (1), the temperature measurement device 150 collects ambient temperature data 302 for a property. In the example depicted in FIG. 3, the DMSS 120 is currently on and running a cooling operation when the temperature measurement device 150 collects the ambient temperature data 302. As The ambient temperature data 302 indicates that the present ambient temperature within a property is 78 F.

At step (2), the temperature measurement device 150 determines that ambient temperature matches a target temperature and then provides an indication 304 of this determination to the control unit 110. As described throughout, the temperature measurement device 150 uses a target temperature to determine whether to enable or disable the DMSS 120. In some instances, the target temperature is a setpoint temperature configured by the temperature measurement device 150 and used to initiate and terminate heating/cooling operations. In the example shown in FIG. 3, because the setpoint temperature matches the ambient temperature, the DMSS 120 no longer needs to continue the cooling operation to reduce the ambient temperature.

In some implementations, the temperature measurement device 150 is a sensing device that only collects temperature data and provides the temperature data for output. In such implementations, the temperature measurement device 150 provides temperature data indicating an ambient temperature to the control unit 110. The control unit compares the ambient temperature indicated by the temperature data to a target temperature and then generates the indication 304 shown in FIG. 3.

At step (3), the control unit 110 provides an instruction 306 to the controller 130 to turn off the DMSS 120. The control unit 110 can provide the instruction 306 directly to the controller 130 (e.g., using a short-range connection) or via a local network (e.g., network 105). The instruction 306, when received by the controller 130, causes the controller 130 to transmit a command 308 to the DMSS 120.

At step (4), the controller 130 transmits the command 308 to the DMSS 120. The controller 130 can provide the command 308 based on the instruction 306 for the DMSS 120 to terminate the cooling operation. As previously discussed in reference to FIG. 2, the controller 130 can use any suitable communication protocol of the DMSS 120 in providing the command 308. For example, in some instances, the controller 130 is configured to provide the command 308 as an infrared (IR) remote signal that is received by an IR receiving sensor of the DMSS 120 (e.g., an IR receiving sensor on the indoor unit 120A of the DMSS 120). The controller 130 can be programmed to operate as a replacement for a standard controller that is manufactured with the DMSS 120. For example, the controller 130 can emulate standard commands that are recognized by a command receiving element of the DMSS 120. The controller 130 can thereby provide commands to the DMSS 120 in a manner that does not require reconfiguration and/or adjustment of the DMSS 120.

At step (5), the energy measurement device 140 detects that ongoing power consumption associated with the indoor 120A has reduced or stopped.

The energy measurement device 140 detects that power that was previously being consumed by the DMSS 120 has been reduced or stopped, which is then used to infer that the DMSS 120 has successfully performed the command 308 (i.e., terminating the cooling operation) and that command 308 does not need to be retried. This can be represented by the DMSS 120 being turned off (no power consumption) or that the DMSS 120 stopping the cooling operation but still remaining turned on (reduced energy consumption). In some instances, the energy measurement device 140 may be configured to use a threshold power consumption value to differentiate between the different types of responses of the DMSS 120 to the command. For example, if the energy measurement device 140 detects power consumption of the DMSS 120 in response to the command 308 that is above the threshold, then the energy measurement device 140 can determine that the DMSS 120 did not successfully execute the command 308 (e.g., the DMSS 120 did not terminate the cooling operation but instead reduced fan speed). Alternatively, if the energy measurement device 140 detects power consumption of the DMSS 120 in response to the command 308 that is below the threshold, then the energy measurement device 140 can determine that the DMSS 120 successfully executed the command 308 (e.g., the DMSS 120 terminated the cooling operation). In these examples, the threshold can be determined empirically during a registration phase in which the energy measurement device 140 measures different parameters (e.g., voltage, current, resistance, impedance, capacitance) associated with different operating modes of the DMSS 120 (e.g., different types of cooling or heating operations, maximum fan speed, minimum fan speed).

At step (6), the energy measurement device 140 provides energy consumption data 312 to the control unit 110. The energy consumption data 312 indicates whether any change in power consumption was detected by the energy measurement device 140 within a predetermined time period of the command 308 being provided. For example, if the energy measurement device 140 detects no power consumption or reduced energy consumption by the DMSS 120, then energy consumption data 312 indicates this information.

At step (7), the control unit 110 provides command confirmation data 314 to the user device 170. The control unit 110 determines whether the DMSS 120 successfully performed the command 308 based on the energy consumption data 312 and generates command confirmation data 314. In the example shown in FIG. 3, the control unit 110 determines that the DMSS 120 successfully performed the command 308 based on the reduced or no power consumption indicated by the energy consumption data 312.

At step (8), the user device 170 provides an indication 316 that the setpoint temperature was reached and the DMSS 120 has been turned off as a result. Using the technique shown in FIG. 3, data collected by a monitoring system that is separate from the DMSS 120 (e.g., a monitoring system that includes the temperature measurement device 150) can be used to adjust operation of the DMSS 120. This type of configuration enables selective control of the DMSS 120 in a similar manner as a HVAC system that is controlled based on temperature collected by an associated thermostat.

Figure 4:
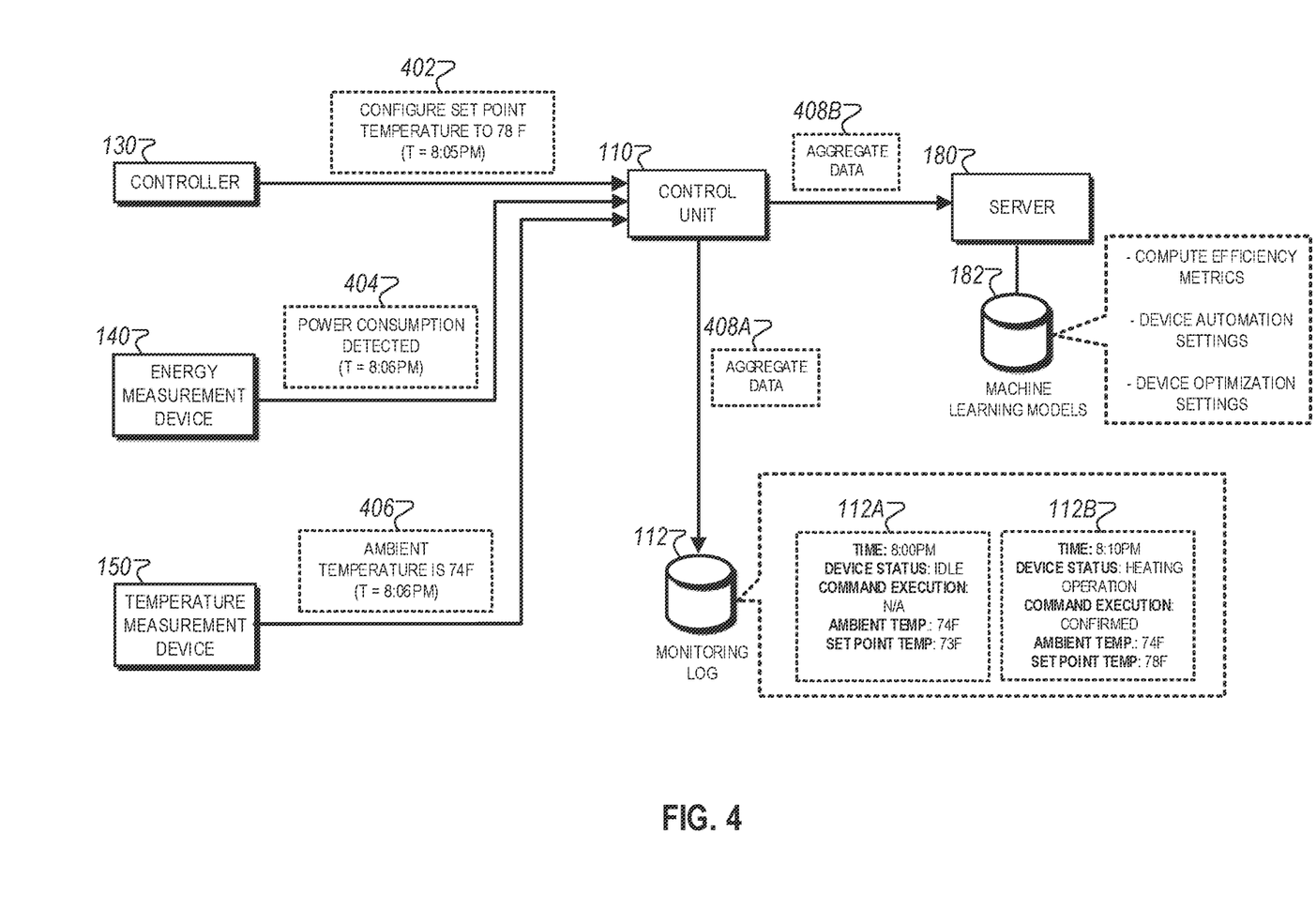
FIG. 4 illustrates an example of a technique for monitoring analytic parameters associated with operation of a DMSS in a property.

FIG. 4 illustrates an example of a technique for monitoring analytic parameters associated with operation of a DMSS in a property. In this example, the control unit 110 obtains data collected from various devices in a property and stores the received data as monitoring log 112. The control unit 110 also aggregates the received data and provides aggregate data 408B to the server 180 for machine learning training. Using the technique shown in FIG. 4, the system can recursively evaluate generate data to improve aspects of DMSS operation, such as detecting reoccurring usage patterns associated with the DMSS 120, identifying opportunities for reducing energy consumption, identifying likelihoods of malfunctioning activity, or recommendations for adjusting use.

As shown in FIG. 4, the control unit 110 obtains setpoint temperature data 402 from the controller 130, power consumption data 404 from the energy measurement device 140, and ambient temperature data 406 from the temperature measurement device 150. In some instances, the control unit 110 may store the setpoint temperature data 402 as opposed to obtaining it form the controller 130. The control unit 110 may receive this data on an ad-hoc basis (e.g., as data is collected by each device) or at specific time point (e.g., after completion of a heating/cooling operation using the DMSS 120). In the example shown in FIG. 4, data is collected at a certain time (e.g., between 8:05 PM and 8:06 PM) corresponding to when user submits a command to initiate a cooling operation on the DMSS 120 using the controller 130 (by setting a setpoint temperature to 78 F).

The control unit 110 aggregates the data received from the controller 130, the energy measurement device 140, and the temperature measurement device 150 then stores aggregated data 408A in a monitoring log 112. The monitoring log 112 identifies data relating to operation of the DMSS 120, which can be used to identify events, metrics or patterns. In the examples shown in FIG. 4, the monitoring log 112 includes events 112A and 112B, which are used to identify a time when the DMSS 120 was enabled.

Specifically, event 112A indicates that an idle device status for the DMSS 120 at 8:00 PM (which may be determined based on power consumption) and event 112B indicates a heating operation status for the DMSS 120 at 8:10 PM (which may be determined based on a command provided to the controller 130 from the user device 170). The events 112A and 112B also indicate an ambient temperature and a setpoint temperature associated with the DMSS 120, which can be used to determine usage patterns and/or user preferences associated with the DMSS 120. As examples, this information can be used to determine how frequently a user adjusts the setpoint temperature, times when the setpoint temperature adjustments are provided, temperature ranges for the most frequent setpoint temperatures, among others.

Additionally, or alternatively, the control unit 110 can also send aggregate data 408B to the server 180 for further analysis. The server 180 can using various process techniques to identify trends, patterns, and/or metrics associated with the aggregate data 408B. For instance, the server 180 can provide the aggregate data 408B to one or more learning models that are trained to predict DMSS usage patterns based on historical usage by a particular user or users of a set of similar properties (e.g., properties with similar square footage, properties located in the same geographic region, properties of the same property type). In some instances, the server 180 can use other types of statistical models to predict DMSS usage patterns and compute predictive analytics parameters based on the predicted DMSS usage patterns.

As shown in FIG. 4, the server 180 can include different types of predictive analytics parameters. Efficiency metrics that can relate to anticipated usage of the DMSS 120 based on historical usage data specified in the aggregate data 408B. For example, the server 180 can determine energy consumption by the DMSS 120 over a specified time period (e.g., daily, weekly, monthly, etc.) and use this information to determine the power efficiency of the DMSS 120 (e.g., the amount of energy consumed in performing a certain operation relative to the change in ambient temperature as a result of the certain operation being performed).

Automation settings can relate to configuration of the DMSS 120 by the server 180 based on evaluating prior usage and/or user preferences. For example, the server 180 can provide an instruction to the control unit 110 to initiate a cooling operation by the DMSS 120 every morning at 7:00 AM if the aggregate data 408B indicates that the user has previously manually lowered the setpoint temperature every morning around the same time.

Device optimization settings may relate to configuration of the DMSS 120 based on usage parameters, such as energy consumption, probability of maintenance, or ambient temperature fluctuations. The server 180 can determine the optimization settings based on evaluating historical information specified in the aggregate data 408B. As examples, the optimization settings can include settings that reduce overall energy consumption by the DMSS 120 while maintaining core heating and cooling operations, the frequency of operation that reduces the likelihood that the DMSS 120 will require maintenance within a specified time period (e.g., six months, one year, five years), or the type of operation that reduces the magnitude of ambient temperature fluctuations within a property that may make the user feel uncomfortable.

Figure 5:
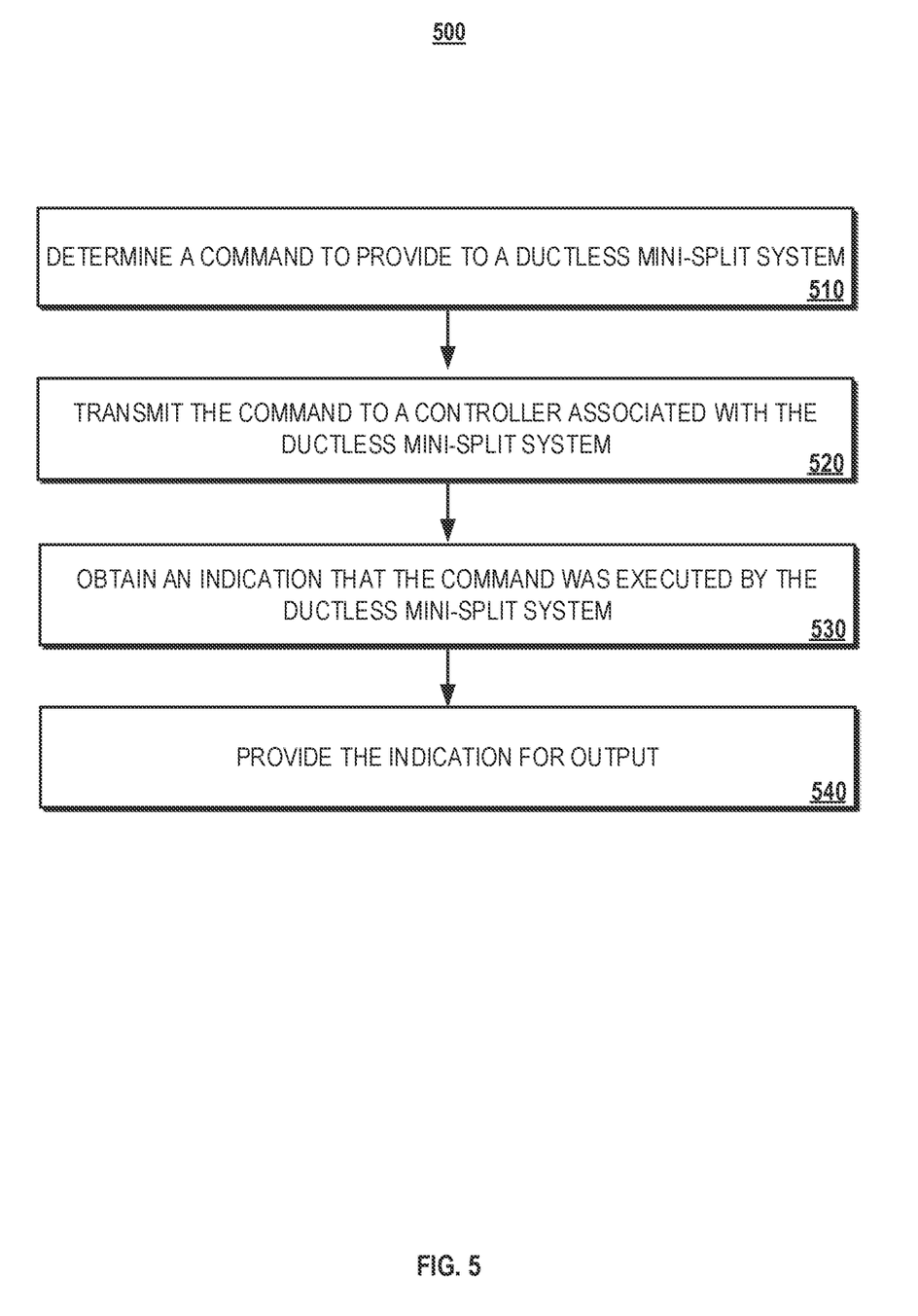
FIG. 5 illustrates an example of a process for using a retrofit control system to confirm execution of a command by a DMSS.

FIG. 5 illustrates an example of a process 500 for using a retrofit control system to confirm execution of a command by a ductless mini-split system. Briefly, the process 500 includes the operations of determining a command to provide to a ductless mini-split system (510), transmitting the command to a controller associated with the ductless mini-split system (520), obtaining an indication that the command was executed by the ductless mini-split system (530), and providing the indication for output (540).

In general, the process 500 can be used to provide retrofit control of a ductless mini-split system within a property. The process 500 can be performed by one or more components of the system 100. For example, in some implementations, the process 500 is locally executed on the control unit 110, which determines a command to provide to the DMSS 120 based on user input through a monitoring application on the user device 170, provides data indicating the command to the controller 130, and obtains an indication that the command was executed based on power consumption data collected by the energy measurement device 140. In some implementations, the process 500 is remotely performed by the server 180 based on data obtained from the control unit 110. In such implementations, the control unit 110 relays data collected by devices located inside the property 101 (e.g., controller 130, energy measurement device 140, temperature measurement device 150, user device 170), and the server 180 determines the command to provide to the DMSS 120 based on the obtained data. In some implementations, the process 500 are performed by multiple components of the system 100. For example, the control unit 110 can determine a command and provide the command to the DMSS 120, but the server 180 may receive the indication that the command was performed by the DMSS 120 and then provide an indication for output through a mobile application that is running on the user device 170. The descriptions that follow reference the control unit 110 for simplicity but are not intended to limit the process 500 to being performed solely by this component.

In more detail, the process 500 includes the operation of determining a command to provide to a ductless mini-split system (510). For example, the control unit 110 can determine a command to provide to the DMSS 120. The command can involve turning on the DMSS 120 to perform an operation (e.g., a heating operation, a cooling operation). The command can also involve turning off the DMSS 120 to stop an operation that is currently being performed by the DMSS 120.

The control unit 110 can determine the command based on various factors. In some instances, the command is determined based on user input received through a mobile application running on the user device 170. For example, the user may manually request the DMSS 120 to be turned on, and in response, the control unit 110 determines a command to power on the DMSS 120. In some instances, the command is automatically determined with minimal or no user intervention. For example, if the setpoint temperature specified by a user is lower than a current ambient temperature measured by the temperature measurement device 150, then the control unit 110 may determine a command to turn on the DMSS 120 and initiate a cooling operation.

The process 500 includes the operation of transmitting the command to a controller associated with the ductless mini-split system (520). For example, the control unit 110 may transmit a command to the controller 130, which is associated with the DMSS 120. In some instances, the controller 130 is configured to transmit a signal to an IR receiver on the DMSS 120. The controller 130 is also a network-enabled device that communicates with the control unit 110 using, for instance, a local area network connection such as network 105. Once the controller 130 receives command data, the controller 130 transmits a command to the DMSS 120.

The process 500 includes the operation of obtaining an indication that the command was executed by the ductless mini-split system (530). For example, the control unit 110 receives an indication from the energy measurement device 140 that the command was executed by the DMSS 120. The indication can be based on measured power consumption, which is used to infer command execution in response to the command being provided to the DMSS 120. As discussed in reference to FIG. 2, the energy measurement device 140 determines that the command was performed by the DMSS 120 if the power consumption by the indoor unit 120A changes within a specified time period (e.g., within 3, 10, 30 seconds) after the controller 130 provides a commend to the DMSS 120. For example, if the command involves turning on the DMSS 120, then the energy measurement device 140 determines the command was successfully performed if energy consumption by the indoor unit 120A increases approximately ten seconds after the command is transmitted by the controller 130. As another example, if the command involves turning off the DMSS 120, then the energy measurement device 140 determines the command was successfully performed if energy consumption by the indoor unit 120A decreases or becomes non-detectable two seconds after the command is transmitted by the controller 130.

In some instances, the controller 130 may be configured to submit commands iteratively if no confirmation of command execution by the DMSS 120 is received within a specified time period after the command is provided by the controller 130. For example, if the energy measurement device 140 does not detect increased energy consumption by the indoor unit 120A within approximately ten seconds after the controller 130 transmits the command, then the control unit 110 may instruct the controller 130 to re-submit the command and/or provide a new command. In such instances, the controller 130 can provide a duplicate command (e.g., a command with the same mode of instruction) or a modified command (e.g., a command with an higher or lower set point temperature).

The process 500 includes the operation of providing the indication for output (540). For example, the control unit 110 can provide an indication to the user device 170 that the DMSS 120 successfully performed the command. In the example shown in FIG. 2, the control unit 110 provides command confirmation 208 to the user device 170, and in response, the user device 170 presents a notification 202B indicating that the DMSS 120 successfully executed the command.

Figure 6:
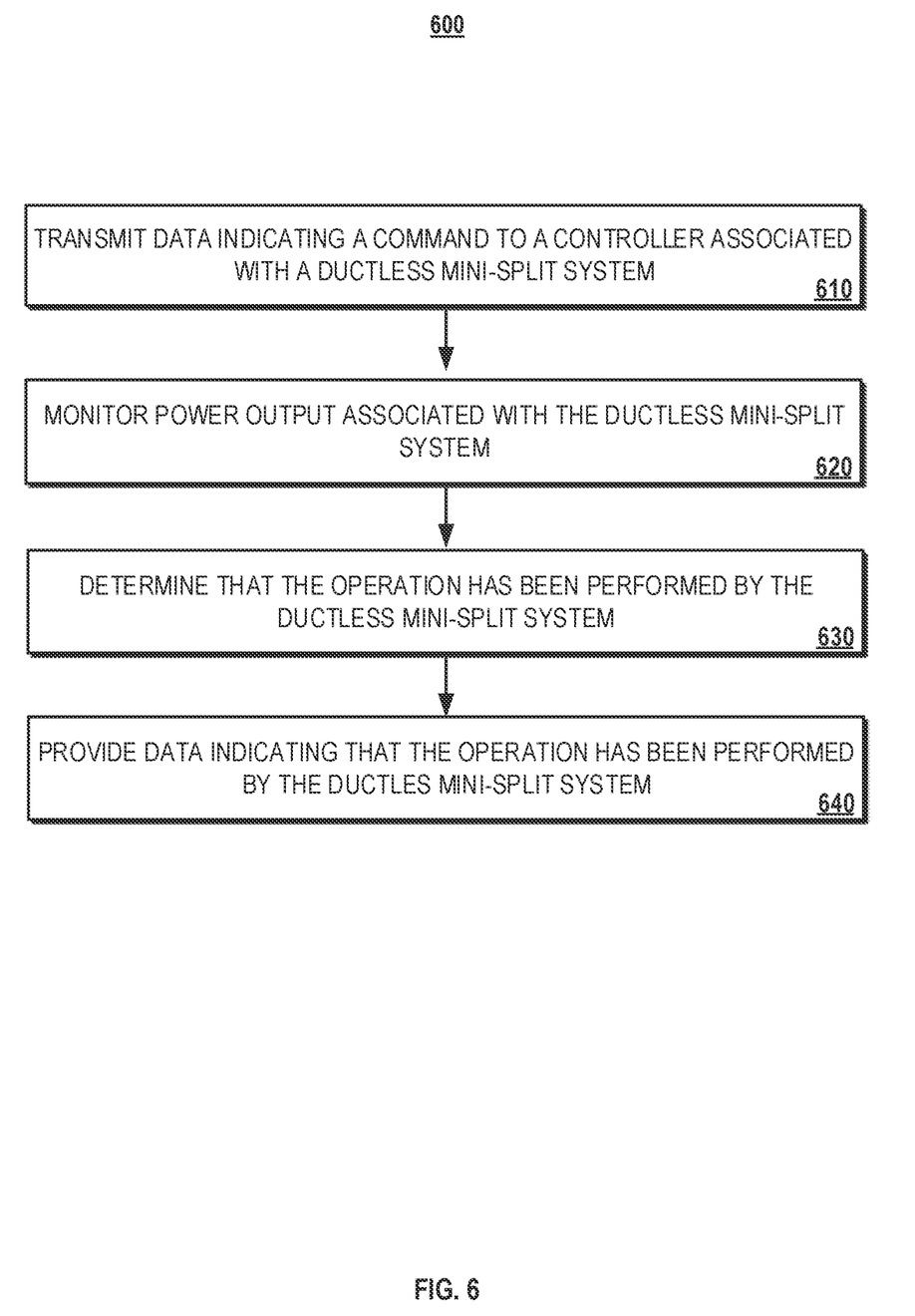
FIG. 6 illustrates an example of a process for retrofit control of a DMSS.

FIG. 6 illustrates an example of a process 600 for retrofit control of a ductless mini-split system. Briefly, the process 600 includes the operations of transmitting data indicating a command to a controller associated with a ductless mini-split system (610), monitoring power output associated with the ductless mini-split system (620), determining that the operation has been performed by the ductless mini-split system (630), and providing, for output, data indicating that the operation has been performed by the ductless mini-split system (640).

In general, the process 600 can be used to provide retrofit control of a ductless mini-split system within a property. The process 600 can be performed by one or more components of the system 100. In some implementations, the process 600 is executed locally within a property, e.g., by control unit 110. In such implementations, control unit 110 can transmit a command to controller 130 based on user input through a monitoring application on the user device 170. The control unit 110 also obtains an indication that the command was executed based on power consumption data collected by the energy measurement device 140. In some implementations, the process 600 is executed remote from a property based on data obtained from the control unit 110, e.g., by the server 180. In such implementations, the control unit 110 relays data collected by devices located inside the property 101 (e.g., controller 130, energy measurement device 140, temperature measurement device 150, user device 170), and the server 180 determines the command to provide to the controller 130 based on the obtained data. In some implementations, the process 600 is performed by multiple components of the system 100. For example, the control unit 110 can transmit the command to controller 130, but the server 180 may receive the indication that the command was performed by the DMSS 120 and then provide an indication for output through a mobile application running on the user device 170. The descriptions that follow reference the control unit 110 for simplicity but are not intended to limit the process 600 to being performed solely by this component.

The process 600 includes the operation of transmitting data indicating a command to a controller associated with a ductless mini-split system (610). For example, the control unit 110 may transmit a command to the controller 130, which is associated with the DMSS 120. The command causes the DMSS 120 to configure an operation. In some instances, the operation relates to power control of the DMS 120, such as turning on the DMSS 120 (if the DMSS 120 is currently turned off) or turning off the DMSS 12 (if the DMSS 120 is currently turned off). In some instances, the operation relates to adjusting a present configuration of the DMSS 120, such as initiating a cooling operation, initiating a temperature regulation function (e.g., heating/cooling operation), adjusting an internal set point temperature used by the DMSS 120 to coordinate a temperature regulation function, and/or adjusting the magnitude of a temperature regulation function.

The controller 130 can be configured to configured to control the DMSS 120 using any suitable means of communications. For example, the controller 130 can be configured to transmit a signal to an IR receiver on the DMSS 120 that configures components of the DMSS 120 to initiate a given operation. The controller 130 can also be a network-enabled device that communicates with the control unit 110 using, for instance, a local area network connection such as network 105.

In some implementations, operation 610 is performed in response to user interaction with user device 170. For example, as shown in FIG. 2, user device 170 can present an interface 202A that allows a user to initiate climate adjustment in a property. In this example, control unit 110 sends a command to controller 130 in response to a user input on interface 202A indicating that a heating operation should be started. As described throughout, interface 202A can be presented based on passive monitoring techniques used by other devices located in the property, such as temperature measurement device 150 and sensors 160, among others.

In some implementations, the operation 610 can be passively initiated based on monitoring conducted by devices located in a property. For example, the temperature measurement device 150 can determine that the ambient temperature in a property is higher than a set point, and in response, initiate operation 610 to configure DMSS 120 to initiate a cooling operation. In this way, process 600 enables DMSS 120 to be configured in a similar fashion if the device were a component of a smart climate monitoring system.

The process 600 includes the operation of monitoring power output associated with the ductless mini-split system (620). For example, the control unit 110 may monitor power output of the DMSS 120 based on data collected energy consumption data collected by the energy measurement device 140. The energy measurement device 140 can be configured to one or more electronic components of the DMSS 120 and detect when the DMSS 120 is turned on. The energy measurement device 140 can detect any suitable measurement parameter, such as current, voltage, resistance, capacitance, or impedance, associated with operation of the DMSS 120. If the energy measurement device 140 detects change in a measurement parameter within a specified time period of the controller 130 providing the command 204 (e.g., within one second, thirty seconds, one minute, etc.), then the system 100 can confirm that the DMSS 120 successfully performed the command.

The process 600 includes the operation of determining that the operation has been performed by the ductless mini-split system (630). For example, the control unit 110 may determine that operation has been performed by the DMSS 120 based on monitoring power consumption data collected by energy measurement device 140. If the energy measurement device 140 detects change in a measurement parameter within a specified time period of the controller 130 providing the command 204 (e.g., within one second, thirty seconds, one minute, etc.), then the system 100 can confirm that the DMSS 120 successfully performed the command.

In some implementations, operation 630 includes additional sub-operations. For example, the control unit 110 and/or energy measurement device 140 can measure power output associated with the ductless mini-split system within a time period after a command has been transmitted to the controller 130. The control unit 110 and/or energy measurement device 140 can then determine that the power output measured within the time period satisfies a predetermined threshold. For example, if the measured power output exceeds the threshold, then the control unit 110 can determine that the DMSS 120 performed the operation (given a low likelihood that the measured power output was not due to a change in configuration of the DMSS 120 as a result of receiving an incoming instruction from controller 130).

Alternatively, if the measured power output does not exceed the threshold, then the control unit 110 can determine that the DMSS 120 did not perform the operation and the measured power output may be due to some other reason. When the control unit 110 determines that the DMSS 120 did not perform the operation, the control unit 110 can transmit data indicating the command, e.g., proceed to step 610.

The process 600 includes the operation of providing, for output, data indicating that the operation has been performed by the ductless mini-split system (640). For example, the control unit 110 can provide an indication to the user device 170 that the DMSS 120 successfully performed the command. In the example shown in FIG. 2, the control unit 110 provides command confirmation 208 to the user device 170, and in response, the user device 170 presents a notification 202B indicating that the DMSS 120 successfully executed the command.

As described throughout, in some implementations, process 600 is executed to provide control over DMSS 120 based on monitoring by a monitoring system, such as a smart climate control system, that includes one or more sensors (e.g., sensors 160), a temperature regulating device (e.g., temperature regulating device 150), and/or other associated devices. In such implementations, the DMSS 120 is manufactured independently of the monitoring system. The process 600 thereby enables retrofit control in that operations specified by process 600 allow reactive control of DMSS 120 based on data collected and/or monitored by the monitoring system. For example, as shown in FIG. 3, the control unit 110 can initiate process 600 based on ambient temperature data 302 collected by temperature measurement device 150. In some examples, as shown in FIG. 4, the control unit 110 can initiate process 600 based on processing and/or evaluating data obtained from multiple data sources (e.g., controller 130, energy measurement device 140, temperature measurement device 150). In this way, process 600 can be used to provide fine-tuned control of DMSS 120 in certain circumstances based on the temperature regulation needs within a property. Additionally, process 600 can be employed to enable and/or disable operations of the DMSS 120.

The described systems, methods, and techniques can be implemented in digital electronic circuitry, computer hardware, firmware, software, or in combinations of these elements. Apparatus implementing these techniques can include appropriate input and output devices, a computer processor, and a computer program product tangibly embodied in a machine-readable storage device for execution by a programmable processor. A process implementing these techniques can be performed by a programmable processor executing a program of instructions to perform desired functions by operating on input data and generating appropriate output. The techniques can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing can be supplemented by, or incorporated in, specially designed application-specific integrated circuits (ASICs).

It will be understood that various modifications can be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

The invention claimed is:

1. A method performed by one or more computing devices, the method comprising:
   transmitting data indicating a command to a controller associated with a ductless mini-split system to cause the controller to configure an operation to be performed by the ductless mini-split system;
   monitoring power output associated with the ductless mini-split system based on transmitting the data indicating the command;
   determining that the operation has been performed by the ductless mini-split system using a result of monitoring the power output; and
   providing, for output, second data indicating that the operation has been performed by the ductless mini-split system.

2. The method of claim 1, wherein determining that the operation has been performed by the ductless mini-split system comprises:
   measuring power output associated with the ductless mini-split system within a time period after the data indicating the command has been transmitted to the controller;
   determining that the power output measured within the time period satisfies a predetermined threshold; and
   determining that the operation has been performed by the ductless mini-split system in response to determining that the power output measured within the time period satisfies the predetermined threshold.

3. The method of claim 2, wherein:
   the operation to be performed by the ductless mini-split system comprises turning on the ductless mini-split system; and
   determining that the operation has been performed by the ductless mini-split system comprises:
      determining that the power output measured within the time period has increased, and
      determining that the operation has been performed by the ductless mini-split system in response to determining that the power output measured within the time period has increased.

4. The method of claim 2, wherein:
   the operation to be performed by the ductless mini-split system comprises turning off the ductless mini-split system; and
   determining that the operation has been performed by the ductless mini-split system comprises:
      determining that the power output measured within the time period has decreased, and
      determining that the operation has been performed by the ductless mini-split system in response to determining that the power output measured within the time period has decreased.

5. The method of claim 1, wherein monitoring power output associated with the ductless mini-split system comprises receiving, from an energy measurement device, one or more power output parameters within a time period after data indicating the command has been transmitted to the controller.

6. The method of claim 5, wherein the one or more power output parameters comprises one or more of current output, voltage output, resistance, capacitance, or impedance.

7. The method of claim 1, wherein providing data indicating that the operation has been performed by the ductless mini-split system comprises providing, for output to a user device, instructions to cause presentation of a notification indicating that the operation has been performed by the ductless mini-split system.

8. The method of claim 1, further comprising:
   obtaining sensor data collected by one or more sensors located in a property that includes the ductless mini-split system; and
   determining a climate adjustment within the property based on the sensor data collected by the one or more sensors,
   wherein transmitting the data indicating the command to the controller associated with the ductless mini-split system is responsive to determining the climate adjustment within the property.

9. The method of claim 8, wherein:
   the climate adjustment within the property comprises a set point adjustment associated with a thermostat of the property; and
   the command transmitted to the controller associated with the ductless mini-split system comprises a command for a temperature regulation operation to be performed by the ductless mini-split system.

10. The method of claim 9, wherein:
    the set point adjustment comprises a reduction to a set point temperature associated with the thermostat of the property; and
    the temperature regulation operation performed by the ductless mini-split system comprises a cooling operation.

11. The method of claim 9, wherein:
    the set point adjustment comprises an increase to a set point temperature associated with the thermostat of the property; and
    the temperature regulation operation performed by the ductless mini-split system comprises a heating operation.

12. The method of claim 1, further comprising:
    providing, for output to a user device, an indication corresponding to temperature regulation in a property that includes the ductless mini-split system;
    obtaining, from a user device, input specifying an adjustment to temperature regulation in the property; and
    determining the operation to be performed by the ductless mini-split system using the input specifying the adjustment to temperature regulation in the property, and
    wherein transmitting the data indicating the command to the controller associated with the ductless mini-split system is responsive to determining the operation to be performed by the ductless mini-split system.

13. A system comprising:
one or more computing devices; and
one or more storage devices storing instructions to cause the one or more computing devices to perform operations comprising:
transmitting data indicating a command to a controller associated with a ductless mini-split system to cause the controller to configure an operation to be performed by the ductless mini-split system;
monitoring power output associated with the ductless mini-split system based on transmitting the data indicating the command;
determining that the operation has been performed by the ductless mini-split system using a result of monitoring the power output; and
providing, for output, second data indicating that the operation has been performed by the ductless mini-split system.

14. The system of claim 13, wherein determining that the operation has been performed by the ductless mini-split system comprises:
measuring power output associated with the ductless mini-split system within a time period after the data indicating the command has been transmitted to the controller;
determining that the power output measured within the time period satisfies a predetermined threshold; and
determining that the operation has been performed by the ductless mini-split system in response to determining that the power output measured within the time period satisfies the predetermined threshold.

15. The system of claim 14, wherein:
the operation to be performed by the ductless mini-split system comprises turning on the ductless mini-split system; and
determining that the operation has been performed by the ductless mini-split system comprises:
determining that the power output measured within the time period has increased, and
determining that the operation has been performed by the ductless mini-split system in response to determining that the power output measured within the time period has increased.

16. At least one non-transitory computer-readable storage media storing instructions to cause one or more processors to perform operations comprising
transmitting data indicating a command to a controller associated with a ductless mini-split system to cause the controller to configure an operation to be performed by the ductless mini-split system;
monitoring power output associated with the ductless mini-split system based on transmitting the data indicating the command;
determining that the operation has been performed by the ductless mini-split system using a result of monitoring the power output; and
providing, for output, second data indicating that the operation has been performed by the ductless mini-split system.

17. The computer-readable storage media of claim 16, wherein determining that the operation has been performed by the ductless mini-split system comprises:
measuring power output associated with the ductless mini-split system within a time period after the data indicating the command has been transmitted to the controller;
determining that the power output measured within the time period satisfies a predetermined threshold; and
determining that the operation has been performed by the ductless mini-split system in response to determining that the power output measured within the time period satisfies the predetermined threshold.

18. The computer-readable storage media of claim 17, wherein:
the operation to be performed by the ductless mini-split system comprises turning on the ductless mini-split system; and
determining that the operation has been performed by the ductless mini-split system comprises:
determining that the power output measured within the time period has increased, and
determining that the operation has been performed by the ductless mini-split system in response to determining that the power output measured within the time period has increased.

19. The computer-readable storage media of claim 17, wherein:
the operation to be performed by the ductless mini-split system comprises turning off the ductless mini-split system; and
determining that the operation has been performed by the ductless mini-split system comprises:
determining that the power output measured within the time period has decreased, and
determining that the operation has been performed by the ductless mini-split system in response to determining that the power output measured within the time period has decreased.

20. The computer-readable storage media of claim 17, wherein monitoring power output associated with the ductless mini-split system comprises receiving, from an energy measurement device, one or more power output parameters within a time period after data indicating the command has been transmitted to the controller.

* * * * *